US008582531B2

(12) United States Patent
Zhou

(10) Patent No.: US 8,582,531 B2
(45) Date of Patent: Nov. 12, 2013

(54) METHOD AND DEVICE FOR IDENTIFYING NEIGHBORING PSEUDORANDOM NUMBER CONFUSION

(75) Inventor: Chunxiao Zhou, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,030

(22) PCT Filed: May 27, 2010

(86) PCT No.: PCT/CN2010/073321
§ 371 (c)(1),
(2), (4) Date: Oct. 17, 2011

(87) PCT Pub. No.: WO2010/148904
PCT Pub. Date: Dec. 29, 2010

(65) Prior Publication Data
US 2012/0320873 A1 Dec. 20, 2012

(30) Foreign Application Priority Data

Dec. 10, 2009 (CN) .......................... 2009 1 0252165

(51) Int. Cl.
*G01R 31/08* (2006.01)
*H04W 4/00* (2009.01)
*H04W 36/00* (2009.01)
*H04W 40/00* (2009.01)
*H04W 24/00* (2009.01)

(52) U.S. Cl.
USPC .......... 370/331; 370/252; 455/446; 455/436; 455/456.1

(58) Field of Classification Search
None
See application file for complete search history.

(56) References Cited

U.S. PATENT DOCUMENTS

| 6,049,569 | A | * | 4/2000 | Radha et al. ............. 375/240.12 |
| 6,058,136 | A | | 5/2000 | Ganesh et al. |
| 6,317,453 | B1 | * | 11/2001 | Chang ........................... 375/140 |
| 6,778,833 | B1 | * | 8/2004 | Fortuna ......................... 455/446 |
| 8,045,526 | B2 | * | 10/2011 | Vargantwar et al. .......... 370/331 |
| 8,351,943 | B2 | * | 1/2013 | Jovanovic ..................... 455/437 |
| 2009/0059869 | A1 | | 3/2009 | Rajasimman et al. |
| 2011/0189995 | A1 | * | 8/2011 | Tinnakornsrisuphap et al. ............................ 455/436 |

FOREIGN PATENT DOCUMENTS

CN        101404813 A      4/2009

OTHER PUBLICATIONS

International Search Report for PCT/CN2010/073321 dated Sep. 3, 2010.

* cited by examiner

*Primary Examiner* — Hassan Phillips
*Assistant Examiner* — Hicham Foud
(74) *Attorney, Agent, or Firm* — Ling Wu; Stephen Yang; Ling and Yang Intellectual Property

(57) ABSTRACT

A method and apparatus for identifying a confusion of neighboring pseudo numbers (PN) are provided. The method includes: obtaining a first location information when a mobile station establishes a call with a reference base station where a reference sector is located, and a second location information after establishing a handover in a process of the call, with a neighboring base station where a valid non-reference sector is located; and when a deviation between the first location information and the second location information is larger than a threshold and the mobile station drops the call after establishing the handover, determining that the confusion of the neighboring PNs exists in the neighboring base station. The method and apparatus are able to fast identify the confusion of the neighboring PNs in the existing CDMA network, and achieve the object of optimizing the network quality and improving the product competitiveness.

16 Claims, 4 Drawing Sheets

US 8,582,531 B2

METHOD AND DEVICE FOR IDENTIFYING NEIGHBORING PSEUDORANDOM NUMBER CONFUSION

TECHNICAL FIELD

The present invention relates to the communication field, and particularly, to a method and apparatus for identifying a confusion of neighboring pseudo numbers.

BACKGROUND OF THE RELATED ART

In the Code Division Multiple Access (CDMA) system, a base station uses Pseudo Number (PN) sequences with different time offsets to modulate, wherein the PN sequences are generated by a 15 order shift register, and have 32768 phases, namely 32768 chips. Since the phases of two PN sequences which have difference of one chip are very close and the propagation space of a unit chip is smaller, a mobile station is very difficult to distinguish that signals come from which base station. In order to increase the isolation of different PN sequences, the interval between phases of available PN sequences is configured to be 64 chips. The available PN sequence is defined by its PN offset, thus there are at most 512 PN offsets in the network. Due to the complexity of propagation environment and other factors, the interval of 64 chips is still unable to make the mobile station distinguish base stations, so a parameter PILOT_INC is introduced for further increasing the isolation, that is, the number of the available PN offsets is 512/PILOT_INC, and thus the PN offsets are further reduced.

With increasing of the user amount, a large number of new base stations require to be built on the basis of the original CDMA network, which makes the phenomena of a confusion of the same PNs and/or a confusion of neighboring PNs to always occur, causes the network interference and mobile station dropping calls, and severely affects the network quality.

The confusion of neighboring PNs is that the mobile station is unable to distinguish at least two pilot signals of the PN offsets with the very close phase interval. For example, the mobile station establishes a call with a base station A (PN100); when the mobile station detects a pilot signal of a base station F (PN200) in a neighbor set, and since a propagation delay will cause offset of the phase of the PN short code, a pilot signal of a base station G (PN202) will fall into a search window of the base station F (PN200); and when the mobile station requests to establish a handover with the base station F (PN200), the mobile station can monitor the pilot signal of the base station G (PN202) from the search window of the base station F (PN200); and then if the Walsh code of a traffic channel established for the mobile station in the base station F (PN200) is used by a mobile station in the base station G (PN202), the mobile station in the base station F (PN200) will demodulate and combine the signals of the mobile station using this Walsh code in the base station G (PN202) according to the monitored pilot signal of the base station G (PN202), which results in higher frame error rate and even the problem of dropping calls.

How to identify the confusion of neighboring PNs existing in the existing CDMA network is exigently to be solved faced by the existing CDMA network.

SUMMARY OF THE INVENTION

The present invention provides a method and apparatus for identifying a confusion of neighboring pseudo numbers, which are able to identify the confusion of neighboring PNs.

In order to achieve the above object of the present invention, the present invention provides a following technical scheme:

a method for identifying a confusion of neighboring pseudo numbers, comprises:

obtaining a first location information when a mobile station establishes a call with a reference base station where a reference sector is located, and a second location information after establishing a handover, in a process of said call, with a neighboring base station where a valid non-reference sector is located; and when a deviation between said first location information and said second location information is larger than a threshold and said mobile station drops the call after establishing the handover, determining that the confusion of the neighboring pseudo numbers exists in said neighboring base station.

Said method further has following characteristics:

the step of obtaining said first location information comprises:

obtaining a first reference distance between said mobile station and said reference base station; and determining the first location information of said mobile station according to said first reference distance and a sector azimuth of said reference sector.

Said method further has following characteristics:

when the number of valid non-reference sectors is 1, the step of obtaining said second location information comprises:

obtaining a second reference distance between said mobile station and said neighboring base station; and determining the second location information of said mobile station according to said first reference distance, said second reference distance, and sector lobe angles of said reference sector and/or said valid non-reference sector.

Said method further has following characteristics:

the step of obtaining said second location information further comprises: if the number of said valid non-reference sectors is 1, obtaining a circle 1 by taking said reference base station as a centre and said first reference distance as a radius; obtaining a circle 2 by taking said neighboring base station as a centre and said second reference distance as a radius; and determining a valid node of said circle 1 and said circle 2 as the second location information of said mobile station; and wherein the step of determining said valid node comprises:

if said circle 1 and said circle 2 are separated, a straight line of two centres of two circles intersects with said circle 1 and said circle 2 respectively, virtual intersections are P1 and P2, and said virtual intersection P1 and said virtual intersection P2 are located in the sector lobe angle of the reference sector, then determining that said valid node is at a mid location of said virtual intersection P1 and said virtual intersection P2;

if said circle 1 and said circle 2 are tangent, a point of tangency is P3, and said point of tangency P3 is located in the sector lobe angle of said reference sector, then determining that said valid node is at a location of said point of tangency P3; or if said circle 1 and said circle 2 intersect, intersections are P3 and P4, and if said intersection P3 is in the sector lobe angle of said reference sector, while said intersection P4 is not in the sector lobe angle of said reference sector, then determining that said valid node is at a location of said intersection P3; if both said intersection P3 and said intersection P4 are in the sector lobe angle of said reference sector, said intersection P3 is in the sector lobe angle of said valid non-reference sector, while said intersection P4 is not in the sector lobe angle of said valid non-reference sector, then determining that said valid node is at the location of said intersection P3; and if both said intersection P3 and said intersection P4 are in the sector lobe angles of said reference sector and said valid non-reference sector, then determining that said valid node is at a mid location of said intersection P3 and said intersection P4.

Said method further has following characteristics:

when the number of said valid non-reference sectors is at least 2, the step of obtaining said second location information comprises:

obtaining valid intersections of said reference sector with the valid non-reference sectors and a alternate sector in said neighboring base station respectively; and determining the second location information of said mobile station according to location information of the obtained valid intersections.

Said method further has following characteristics:

said threshold is determined by following values, comprising: a distance from said mobile station to half of the sector lobe angle of said reference sector; and/or an average distance of distances from said mobile station to all the valid intersections.

An apparatus for identifying a confusion of neighboring pseudo numbers, comprises:

an obtaining module, which is configured to: obtain a first location information when a mobile station establishes a call with a reference base station where a reference sector is located, and a second location information after establishing a handover, in a process of said call, with a neighboring base station where a valid non-reference sector is located; and a determining module, which is configured to: determine that the confusion of the neighboring pseudo numbers exists in said neighboring base station when a deviation between said first location information and said second location information is larger than a threshold and said mobile station drops the call after establishing the handover.

Said apparatus further has following characteristics: said obtaining module comprises:

a first obtaining unit, which is configured to: obtain a first reference distance between said mobile station and said reference base station; and a first determining unit, which is configured to: determine said first location information of said mobile station according to said first reference distance and a sector azimuth of said reference sector.

Said apparatus further has following characteristics: said obtaining module further comprises:

a second obtaining unit, which is configured to: obtain a second reference distance between said mobile station and said neighboring base station; and a second determining unit, which is configured to: determine said second location information of said mobile station according to said first reference distance, said second reference distance, and sector lobe angles of said reference sector and/or said valid non-reference sector.

Said apparatus further has following characteristics: said second determining unit is configured to:

if the number of said valid non-reference sectors is 1, obtain a circle 1 by taking said reference base station as a centre and said first reference distance as a radius; obtain a circle 2 by taking said neighboring base station as a centre and said second reference distance as a radius, and determine a valid node of said circle 1 and said circle 2 as the second location information of said mobile station; and wherein said valid node is determined as the following ways:

if said circle 1 and said circle 2 are separated, a straight line of two centres of two circles intersects with said circle 1 and said circle 2 respectively, virtual intersections are P1 and P2, and said virtual intersection P1 and said virtual intersection P2 are located in the sector lobe angle of the reference sector, then determining that said valid node is at a mid location of said virtual intersection P1 and said virtual intersection P2;

if said circle 1 and said circle 2 are tangent, a point of tangency is P3, and said point of tangency P3 is located in the sector lobe angle of said reference sector, then determining that said valid node is at a location of said point of tangency P3; or if said circle 1 and said circle 2 intersect, intersections are P3 and P4, and if said intersection P3 is in the sector lobe angle of said reference sector, while said intersection P4 is not in the sector lobe angle of said reference sector, then determining that said valid node is at a location of said intersection P3; if both said intersection P3 and said intersection P4 are in the sector lobe angle of said reference sector, said intersection P3 is in the sector lobe angle of said valid non-reference sector, while said intersection P4 is not in the sector lobe angle of said valid non-reference sector, then determining that said valid node is at the location of said intersection P3; and if both said intersection P3 and said intersection P4 are in the sector lobe angles of said reference sector and said valid non-reference sector, then determining that said valid node is at a mid location of said intersection P3 and said intersection P4.

Said apparatus further has following characteristics: said second determining unit is configured to:

when the number of said valid non-reference sectors is at least 2, obtain valid intersections of said reference sector with the valid non-reference sector and a alternate sector in said neighboring base station respectively; and determine the second location information of said mobile station according to location information of the obtained valid intersections.

Said apparatus further has following characteristics:

said threshold is determined by following values, comprising: a distance from said mobile station to a half of the sector lobe angle of said reference sector; and/or an average distance of distances from said mobile station to all the valid intersections.

The technical scheme provided in the present invention obtains the first location information when the mobile station establishes the call with the reference base station and obtains the second location information after establishing the handover with the non-reference base station in the process of the call, and when the deviation between the first location information and the second location information is larger than the threshold and the mobile station drops the call after establishing the handover, it is determined that the confusion of neighboring PNs exists in the non-reference base station, which is able to fast identify the confusion of the neighboring PNs in the existing CDMA network, thereby enabling the network maintenance person to carry out over again the PN layout and radio adjustment for the base station in which the confusion of neighboring PNs occurs, and achieving the object of optimizing the network quality and improving the product competitiveness.

PREFERRED EMBODIMENTS OF THE PRESENT INVENTION

Figure 1:
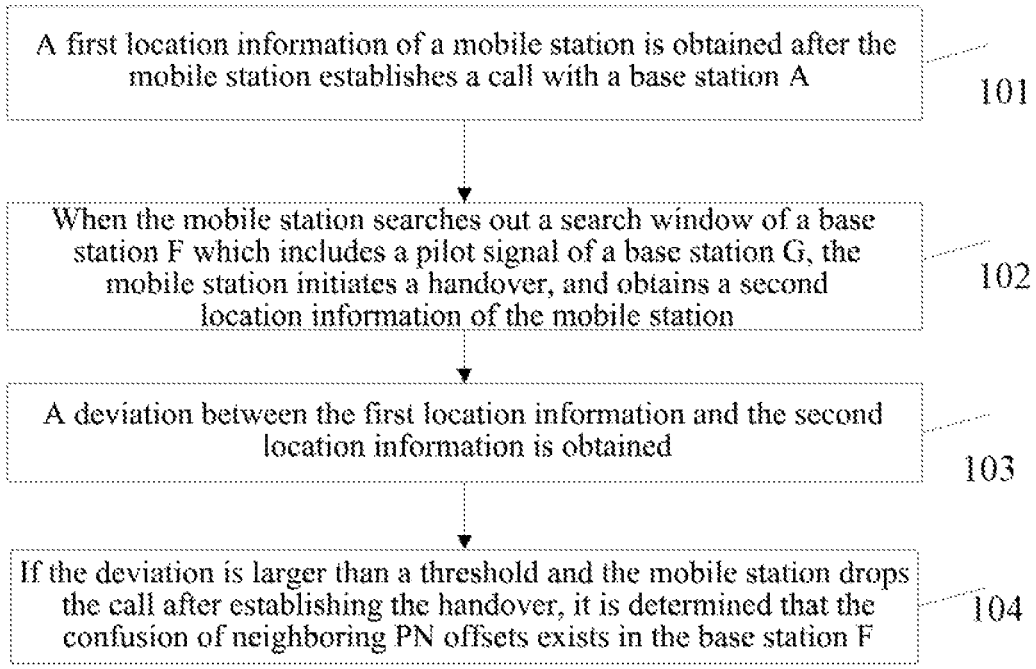
FIG. 1 is a flow chart of a method for identifying a confusion of neighboring PNs in accordance with the present invention.

Technical schemes provided in embodiments of the present invention will be described with reference to the accompanying drawings. The present invention takes a post processing software to identify the confusion of the neighboring PNs according to data of Call Detail Trace (CDT) in the mobile communication system to illustrate, and the specific process is as shown in FIG. 1.

Step 101, a first location information of a mobile station is obtained after the mobile station establishes a call with a base station A;

wherein the first location information of the mobile station includes a longitude and latitude of the mobile station.

In this step, the mobile station measures and obtains one pilot signal of a reference sector, i.e., a pilot signal of the base station A, and then the first location information of the mobile station is obtained by adopting a one-angle location algorithm. Wherein, the one-angle location algorithm is a kind of wireless location algorithm, which is a high applicable and high speed location algorithm combining two location techniques of a Cell ID and Advanced Forward Link Trilateration (AFLT) location algorithms together.

A distance L from the base station A to the mobile station and a location information of the base station A should be obtain in advance before the location information of the mobile station is obtained.

Wherein, the distance L from the base station A to the mobile station can be obtained by the following way:

the base station A sending a broadcast message to the mobile stations in the coverage range, and obtaining the distance L from the base station A to the mobile station according to the time of the broadcast message arriving at the mobile station.

The location information of the base station A includes: a longitude and latitude of the base station, a sector azimuth of the base station, and a sector lobe angle of the base station. The location information of the base station A is obtained from the CDT database at the base station side, and the CDT database is able to be opened for 24 hours and is able to trace the key data of all the users of the current access system, wherein the key data includes the key data of the wireless environment during the uses accessing and processing procedure for the uses accessing inside the system in the process of accessing.

Figure 2:
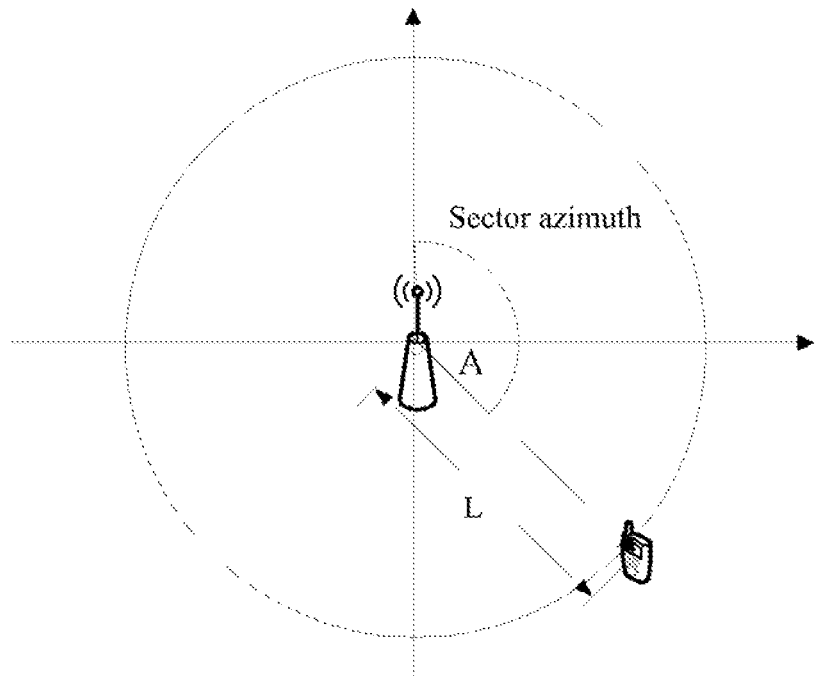
FIG. 2 is a schematic diagram 1 of an application scenario in accordance with the present invention.

After obtaining the above information, obtaining the first location information of the mobile station is specifically as follows:

as shown in FIG. 2, taking the base station A as a centre and taking the distance from the mobile station to the base station A as a radius, a circle A can be obtained; obtain the sector azimuth of the base station A, and determine the intersection between the sector azimuth of the base station A and the circle A which is the first location information of the mobile station.

Step 102, when the mobile station searches out a search window of a base station F, including a pilot signal of a base station G, the mobile station initiates a handover, and obtains a second location information of the mobile station.

In the present embodiment, a PN offset of the base station F is PN200, and a PN offset of the base station G is PN202. Since propagation delays cause phase change, the pilot signal of the base station G falls into the search window of the base station F. The mobile station requests to establish the handover with the base station F. After the base station F establishes a traffic channel of communicating with the mobile station, the mobile station monitors and obtains the pilot signal of the base station G in the search window, and sends the phase of the pilot signal of the base station G to a base station controller; and the post processing software obtains the second location information of the mobile station according to the phase.

The second location information of the mobile station is obtained by adopting a multi-angle location method. The multi-angle location method refers that the mobile station measures and obtains pilot signals of one reference sector and N valid non-reference sectors, wherein N is larger than or equal to 1, and wherein the valid non-reference sector refers that the PN offset of this sector is in the activation set or candidate set of the mobile station, and does not belong to the same base station with the reference sector. In the present embodiment, the reference sector measured and obtained by the mobile station is a sector of the base station A, and the valid non-reference sector measured and obtained by the mobile station is the sector of the base station G.

It will take one valid non-reference sector as an example to describe obtaining the second location information of the mobile station:

Taking, respectively, the locations of the base station A and the base station G as centres and the distances from the mobile station to the above two base stations as radiuses, two circles can be obtained, respectively the circle A and a circle G.

Wherein, the location relationship of the circle A and the circle G has following three cases: separation, tangency and intersection. It will be illustrated below with reference to the accompanying drawings respectively.

Figure 3:
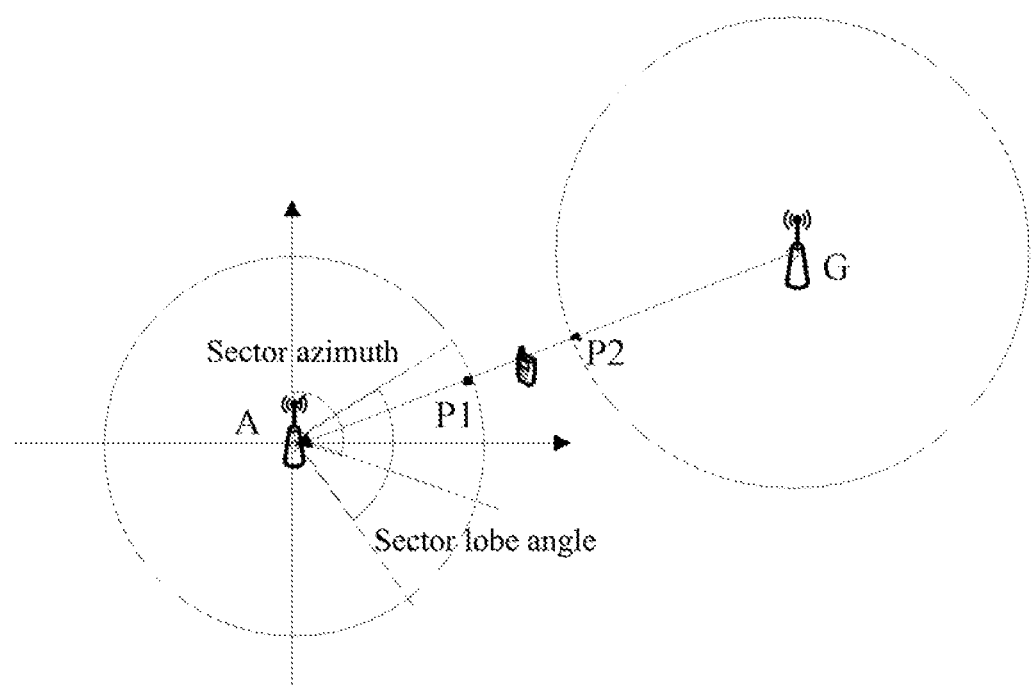
FIG. 3 is a schematic diagram 2 of an application scenario in accordance with the present invention.

As shown in FIG. 3, the circle A and the circle G are separated, wherein virtual intersections of a straight line AG of the centre of the circle A and the centre of the circle G with the two circles are a virtual intersection P1 and a virtual intersection P2, respectively. If the virtual intersection P1 and the virtual intersection P2 are within the sector lobe angle of the circle A, then the second location information of the mobile station is at the midpoint of the straight line of the virtual intersection P1 and the virtual intersection P2.

Figure 4:
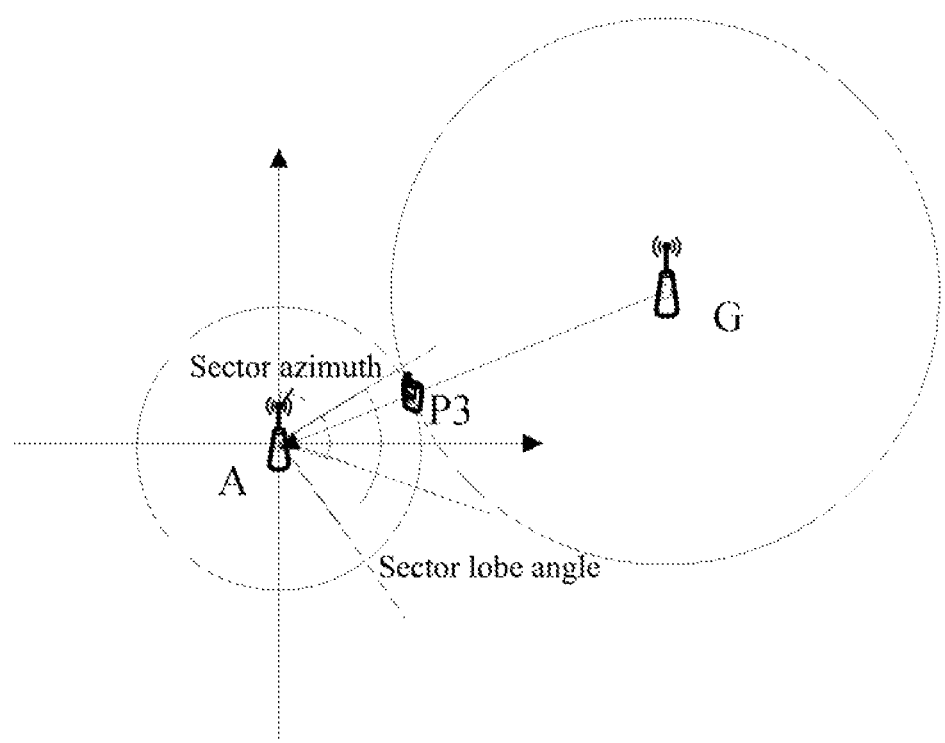
FIG. 4 is a schematic diagram 3 of an application scenario in accordance with the present invention.

As shown in FIG. 4, the circle A and the circle G are tangent, and the point of tangency is P3. If the point of tangency P3 is in the lobe angle of the circle A, then the second location information of the mobile station is the location of the point of tangency P3.

It should be noted that, if the point of tangency P3 is not in the lobe angle of the circle A, then the second location information of the mobile station is the intersection location of the sector azimuth of the base station G with the circle G.

Figure 5:
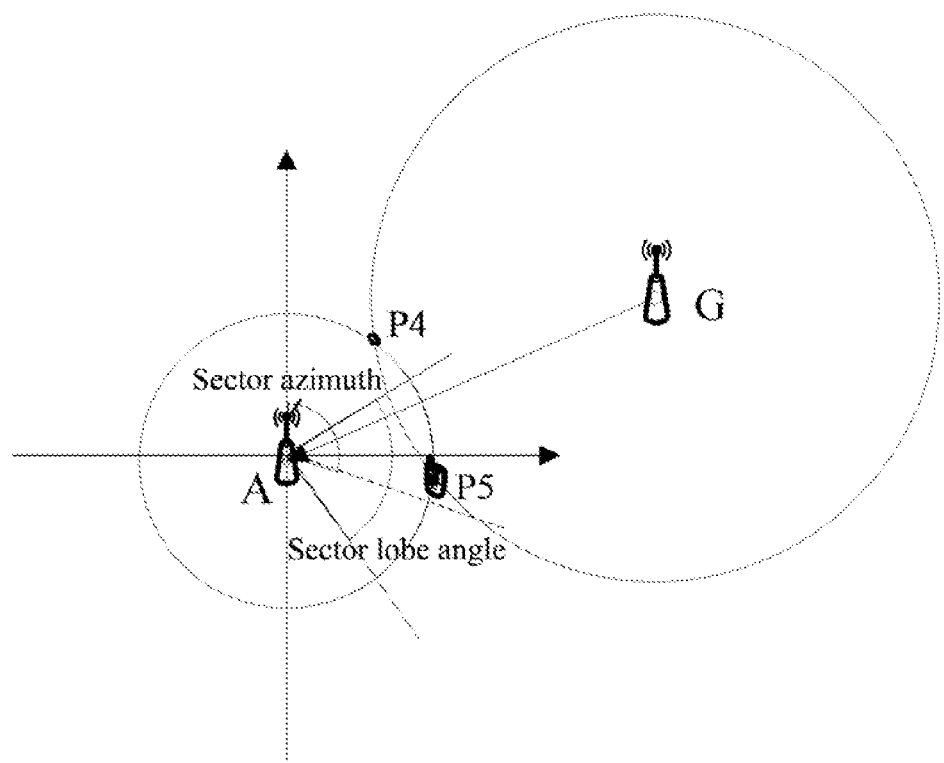
FIG. 5 is a schematic diagram 4 of an application scenario in accordance with the present invention.

When the circle A and the circle G intersect, the intersections are P4 and P5, and there are three subdivided application scenarios in the following according to the location of the intersections in the circle A and the circle G:

As shown in FIG. 5, the P5 is in the sector lobe angle of the circle A, but the intersection P4 is not in the sector lobe angle of the circle A, thus the second location information of the mobile station is the location of the intersection P5 in the sector lobe angle of the circle A.

Figure 6:
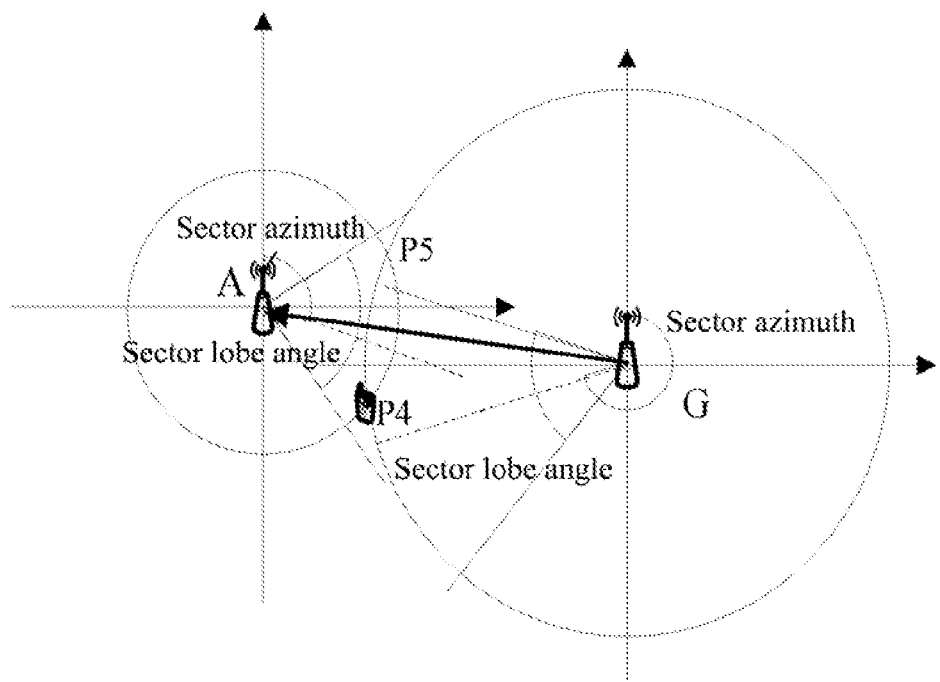
FIG. 6 is a schematic diagram 5 of an application scenario in accordance with the present invention.

As shown in FIG. 6, both the intersections P4 and P5 are in the sector lobe angle of the circle A, the intersection P4 is in the sector lobe angle of the circle G, but the intersection P5 is not in the sector lobe angle of the circle G, thus the second location information of the mobile station is the location of the intersection P4 in the neighboring cell lobe angle of the circle G.

Figure 7:
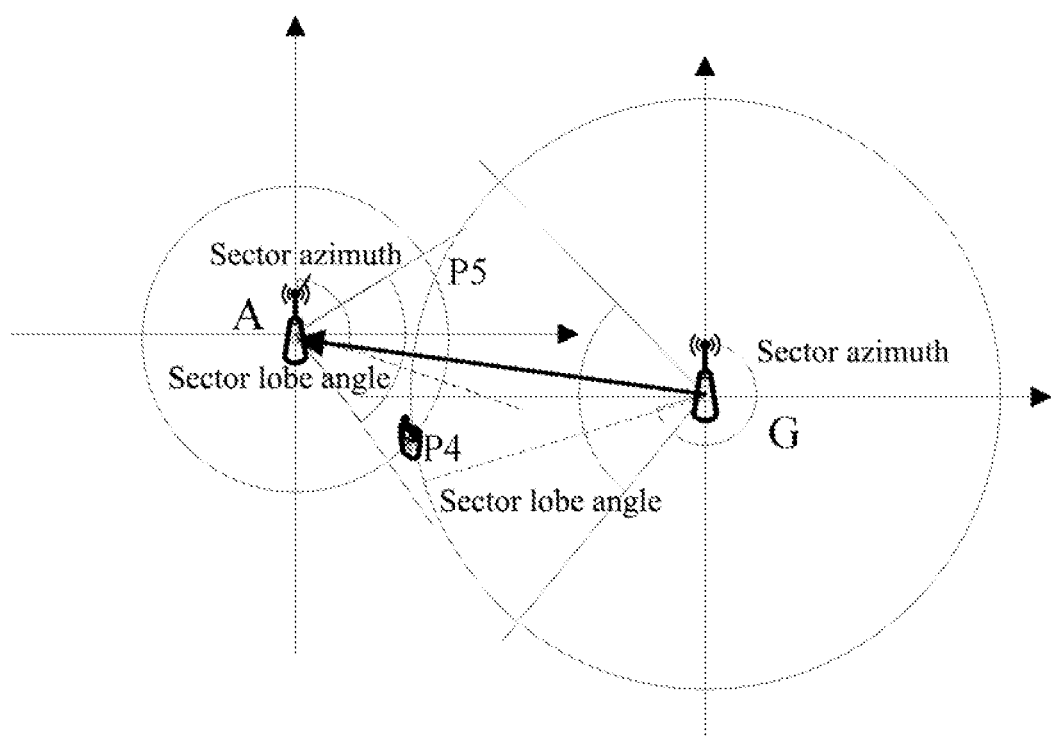
FIG. 7 is a schematic diagram 6 of an application scenario in accordance with the present invention.

As shown in FIG. 7, both the intersections P4 and P5 are in the sector lobe angles of the circle A and circle G, thus the second location information of the mobile station is the location of the midpoint of the intersections P4 and P5 according to the azimuths of the two intersections with the straight line of the centre of the circle of reference sector and the centre of the circle of valid non-reference sector.

The point where the second location information of the mobile station is located is called as a valid intersection for describing conveniently.

If N>1, a concept, a valid non-reference sector circle, is used in the following algorithm, and information of the valid non-reference sector circle includes: the longitude and latitude/azimuth/lobe angle/path loss of the valid non-reference sector, and the longitude and latitude/azimuth/lobe angle/path loss of a same located alternate sector of the valid non-reference sector. The difference between the valid non-reference sector and the same located alternate sector of the valid non-reference sector is that the former one is the nearest base station to the mobile station. We also call the valid non-reference sector circle as a neighboring base station. The location of the mobile station will be estimated as follows. At first, calculate the valid intersection of the reference sector and each valid non-reference sector, and the valid intersection of the reference sector and the same located alternate sector of each valid non reference sector according to the above two-angle location calculation method, wherein, the valid intersection is one intersection located according to the reference sector and the valid non-reference sector or the same located alternate sector, and the specific location method for locating the intersection refers to FIG. 2 to FIG. 6. For the same neighboring base station, one valid intersection of the neighboring base station with the reference sector is taken at most. For example, the number of the valid intersections of the reference sector with the neighboring base stations is m: (X0, Y0), (X1, Y1), . . . , (Xm-1, Ym-1). The number of the valid intersections of the reference sector with the alternate sectors in each neighboring base station is n: (x0, y0), (x1, y1), (xn-1, yn-1). Finally, the location of the MS (X, Y) is determined by:

$$X=(X0+x0+X1+x1 \ldots Xm-1+xn-1)/(m+n),$$

$$Y=(Y0+y0+Y1+y1 \ldots Ym-1+yn-1)/(m+n).$$

Step 103, a deviation between the first location information and the second location information is obtained.

In this step, the location information of the base station F and the base station G is different, Since the second location information obtained by the base station controller according to the location information of the base station G has a large deviation with the practical distance from the base station F to the mobile station, the deviation between the first location information and the second location information will be larger, and then step 104 is performed.

Step 104, if the deviation is larger than a threshold and the mobile station drops the call after establishing the handover, it is determined that the confusion of neighboring PN offsets exists in the base station F.

In this step, the threshold is determined by errors of the one-angle location algorithm and the multi-angle location algorithm. For the one-angle location, the error of the algorithm is the distance from the mobile station to half of the sector lobe angle in the reference sector; and for the multi-angle location, the error of the algorithm is the average distance of distances from the mobile station to all the valid intersections.

When the deviation is larger and the call is dropped after the handover this time, it denotes that the mobile station accesses the wrong base station during the handover, it is determined that the confusion of neighboring PNs occurs in the base station F.

Since the CDT data come from calls of different users in each corner of the network, the CDT has massive data quantity, which makes the features of the speediness and high efficiency of identifying the case of the confusion of neighboring PNs through the present method outstand undoubtedly. Hereby, we can provide an optimization scheme for the base station with the confusion of neighboring PNs occurring, such as carrying out over again PN layout and radio adjustment and so on, which greatly improves the network quality, advances the user's experience, and enhances the product competitiveness. The method provided in the present invention can be applied in the communication field to any product device which needs the wireless location.

The present invention provides an apparatus for identifying a confusion of neighboring PNs, and the apparatus comprises:

an obtaining module, configured to obtain the first location information when the mobile station establishes a call with the reference base station where the reference sector is located and obtain the second location information after the mobile station establishes a handover, in the process of the call, with the neighboring base station where the valid non-reference sector is located; and a determining module, configured to determine that the confusion of neighboring PNs exists in the neighboring base station when the deviation between the first location information and the second location information is larger than the threshold and the mobile station drops the call after establishing the handover.

Furthermore, the obtaining module comprises:

a first obtaining unit, which is used for obtaining a first reference distance between the mobile station and the reference base station; and a first determining unit, which is used for determining the first location information of the mobile station according to the first reference distance and the sector azimuth of the reference sector.

Furthermore, the obtaining module further comprises:

a second determining unit, which is used for obtaining a second reference distance between the mobile station and the neighboring base station; and a second determining unit, which is used for determining the second location information of the mobile station according to the first reference distance, the second reference distance and the sector lobe angles of the reference sector and/or the valid non-reference sector.

Wherein the second determining unit is specifically used for:

if the number of the valid non-reference sectors is 1, obtaining the circle 1 by taking the reference base station as the centre and taking the first reference distance as the radius; obtaining the circle 2 by taking the neighboring base station as the centre and taking the second reference distance as the radius; and determining the valid node of the circle 1 and the circle 2 as the second location information of the mobile station, wherein the way of obtaining the valid node is as follows:

if the circle 1 and the circle 2 are separated, the straight line of centres of two circles intersects with the circle 1 and the circle 2, the virtual intersections are P1 and P2, and the virtual intersection P1 and the virtual intersection P2 are located in the sector lobe angle of the reference sector, then it is determined that the valid node is at the mid location of the virtual intersection P1 and the virtual intersection P2;

if the circle 1 and the circle 2 are tangent, the point of tangency is P3, and the point of tangency P3 is located in the sector lobe angle of the reference sector, then it is determined that the valid node is at the location of the point of tangency P3; and if the circle 1 and the circle 2 intersect, the intersections are P3 and P4, if the intersection P3 is in the sector lobe angle of the reference sector, while the intersection P4 is not, then it is determined that the valid node is at the location of the intersection P3; if both the intersection P3 and the intersection P4 are in the sector lobe angle of the reference sector, and the intersection P3 is in the sector lobe angle of the valid non-reference sector, while the intersection P4 is not, then it is determined that the valid node is at the location of the intersection P3; and if both the intersection P3 and the intersection P4 are in the sector lobe angles of the reference sector and the valid non-reference sector, then it is determined that the valid node is at the mid location of the intersection P3 and intersection P4.

Wherein the second determining unit is specifically used for:

if the number of the valid non-reference sectors is at least two, obtaining the valid intersections of the reference sector with the valid non-reference sectors and the alternate sector in the neighboring base station respectively, and determining the second location information of the mobile station according to location information of the obtained multi valid intersections.

The technical scheme provided in the present invention obtains the first location information when the mobile station establishes the call with the reference base station and obtains the second location information after establishing the handover with the non-reference base station in the process of the call, and when the deviation between the first location information and the second location information is larger than the threshold and the mobile station drops the call after establishing the handover, it is determined that the confusion of neighboring PNs exists in the non-reference base station, which is able to fast identify the confusion of the neighboring PNs in the existing CDMA network, thereby enabling the network maintenance person to carry out over again the PN layout and radio adjustment for the base station in which the confusion of neighboring PNs occurs, and achieving the object of optimizing the network quality and improving the product competitiveness.

The person having ordinary skill in the art could understand that all or parts of steps implementing above embodiments can be implemented by the programs instructing related hardware, and the programs can be stored in one computer readable memory medium. When the programs are executed, one of the steps or the combination thereof in the above method embodiment is included.

Besides, each function unit in each embodiment of the present invention can be implemented by adopting the form of hardware, and also can be implemented by adopting the form of software function module. If the integrated module is implemented in the form of the software function module and is sold and used as an individual product, the integrated module can also be stored in one computer readable memory medium.

The above mentioned memory medium can be a read only memory, a magnetic disk, or an optical disk, and so on.

The above description is only the embodiments of the present invention, but the protection scope of the present invention is not limited to this, and modifications or substitutions, which can be thought easily by those having ordinary skills in the art in the technical scope disclosed in the present invention, shall all fall into the protection scope of the present invention. Therefore, the protection scope of the present invention should be covered by the protection scope of the appended claims.

INDUSTRIAL APPLICABILITY

The technical scheme provided in the present invention obtains the first location information when the mobile station establishes the call with the reference base station and obtains the second location information after establishing the handover with the non-reference base station in the process of the call, and when the deviation between the first location information and the second location information is larger than the threshold and the mobile station drops the call after establishing the handover, it is determined that the confusion of neighboring PNs exists in the non-reference base station, which is able to fast identify the confusion of the neighboring PNs in the existing CDMA network, thereby enabling the network maintenance person to carry out over again the PN layout and radio adjustment for the base station in which the confusion of neighboring PNs occurs, and achieving the object of optimizing the network quality and improving the product competitiveness.

What is claimed is:

1. A method for identifying a confusion of neighboring pseudo numbers, comprising:
   obtaining a first location information when a mobile station establishes a call with a reference base station where a reference sector is located, and a second location information after establishing a handover, in a process of said call, with a neighboring base station where a valid non-reference sector is located; and
   when a deviation between said first location information and said second location information is larger than a threshold and said mobile station drops the call after establishing the handover, determining that the confusion of the neighboring pseudo numbers exists in said neighboring base station.

2. The method as claimed in claim 1, wherein,
   the step of obtaining said first location information comprises:
   obtaining a first reference distance between said mobile station and said reference base station; and
   determining the first location information of said mobile station according to said first reference distance and a sector azimuth of said reference sector.

3. The method as claimed in claim 2, wherein,
   when the number of valid non-reference sectors is 1, the step of obtaining said second location information comprises:
   obtaining a second reference distance between said mobile station and said neighboring base station; and
   determining the second location information of said mobile station according to said first reference distance, said second reference distance, and sector lobe angles of said reference sector and/or said valid non-reference sector.

4. The method as claimed in claim 3, wherein, the step of obtaining said second location information further comprises:
- if the number of said valid non-reference sectors is 1, obtaining a circle 1 by taking said reference base station as a centre and said first reference distance as a radius; obtaining a circle 2 by taking said neighboring base station as a centre and said second reference distance as a radius; and determining a valid node of said circle 1 and said circle 2 as the second location information of said mobile station; and
- wherein the step of determining said valid node comprises:
- if said circle 1 and said circle 2 are separated, a straight line of two centres of two circles intersects with said circle 1 and said circle 2 respectively, virtual intersections are P1 and P2, and said virtual intersection P1 and said virtual intersection P2 are located in the sector lobe angle of the reference sector, then determining that said valid node is at a mid location of said virtual intersection P1 and said virtual intersection P2;
- if said circle 1 and said circle 2 are tangent, a point of tangency is P3, and said point of tangency P3 is located in the sector lobe angle of said reference sector, then determining that said valid node is at a location of said point of tangency P3; or
- if said circle 1 and said circle 2 intersect, intersections are P3 and P4, and if said intersection P3 is in the sector lobe angle of said reference sector, while said intersection P4 is not in the sector lobe angle of said reference sector, then determining that said valid node is at a location of said intersection P3; if both said intersection P3 and said intersection P4 are in the sector lobe angle of said reference sector, said intersection P3 is in the sector lobe angle of said valid non-reference sector, while said intersection P4 is not in the sector lobe angle of said valid non-reference sector, then determining that said valid node is at the location of said intersection P3; and if both said intersection P3 and said intersection P4 are in the sector lobe angles of said reference sector and said valid non-reference sector, then determining that said valid node is at a mid location of said intersection P3 and said intersection P4.

5. The method as claimed in claim 3, wherein,
- when the number of said valid non-reference sectors is at least 2, the step of obtaining said second location information comprises:
- obtaining valid intersections of said reference sector with the valid non-reference sectors and a alternate sector in said neighboring base station respectively; and
- determining the second location information of said mobile station according to location information of the obtained valid intersections.

6. The method as claimed in claim 5, wherein said threshold is determined by following values, comprising: a distance from said mobile station to half of the sector lobe angle of said reference sector; and/or an average distance of distances from said mobile station to all the valid intersections.

7. The method as claimed in claim 4, wherein,
- when the number of said valid non-reference sectors is at least 2, the step of obtaining said second location information comprises:
- obtaining valid intersections of said reference sector with the valid non-reference sectors and a alternate sector in said neighboring base station respectively; and
- determining the second location information of said mobile station according to location information of the obtained valid intersections.

8. The method as claimed in claim 7, wherein said threshold is determined by following values, comprising: a distance from said mobile station to half of the sector lobe angle of said reference sector; and/or an average distance of distances from said mobile station to all the valid intersections.

9. An apparatus for identifying a confusion of neighboring pseudo numbers, comprising:
- an obtaining module, which is configured to: obtain a first location information when a mobile station establishes a call with a reference base station where a reference sector is located, and a second location information after establishing a handover, in a process of said call, with a neighboring base station where a valid non-reference sector is located; and
- a determining module, which is configured to: determine that the confusion of the neighboring pseudo numbers exists in said neighboring base station when a deviation between said first location information and said second location information is larger than a threshold and said mobile station drops the call after establishing the handover.

10. The apparatus as claimed in claim 9, wherein said obtaining module comprises:
- a first obtaining unit, which is configured to: obtain a first reference distance between said mobile station and said reference base station; and
- a first determining unit, which is configured to: determine said first location information of said mobile station according to said first reference distance and a sector azimuth of said reference sector.

11. The apparatus as claimed in claim 10, wherein said obtaining module further comprises:
- a second obtaining unit, which is configured to: obtain a second reference distance between said mobile station and said neighboring base station; and
- a second determining unit, which is configured to: determine said second location information of said mobile station according to said first reference distance, said second reference distance, and sector lobe angles of said reference sector and/or said valid non-reference sector.

12. The apparatus as claimed in claim 11, wherein
- said second determining unit is configured to: if the number of said valid non-reference sectors is 1, obtain a circle 1 by taking said reference base station as a centre and said first reference distance as a radius; obtain a circle 2 by taking said neighboring base station as a centre and said second reference distance as a radius, and determine a valid node of said circle 1 and said circle 2 as the second location information of said mobile station; and
- wherein said valid node is determined as the following ways:
- if said circle 1 and said circle 2 are separated, a straight line of two centres of two circles intersects with said circle 1 and said circle 2 respectively, virtual intersections are P1 and P2, and said virtual intersection P1 and said virtual intersection P2 are located in the sector lobe angle of the reference sector, then determining that said valid node is at a mid location of said virtual intersection P1 and said virtual intersection P2;
- if said circle 1 and said circle 2 are tangent, a point of tangency is P3, and said point of tangency P3 is located in the sector lobe angle of said reference sector, then determining that said valid node is at a location of said point of tangency P3; or
- if said circle 1 and said circle 2 intersect, intersections are P3 and P4, and if said intersection P3 is in the sector lobe angle of said reference sector, while said intersection P4 is not in the sector lobe angle of said reference sector, then determining that said valid node is at a location of said intersection P3; if both said intersection P3 and said intersection P4 are in the sector lobe angle of said reference sector, said intersection P3 is in the sector lobe angle of said valid non-reference sector, while said intersection P4 is not in the sector lobe angle of said valid non-reference sector, then determining that said valid node is at the location of said intersection P3; and if both said intersection P3 and said intersection P4 are in the sector lobe angles of said reference sector and said valid non-reference sector, then determining that said valid node is at a mid location of said intersection P3 and said intersection P4.

13. The apparatus as claimed in claim 11, wherein said second determining unit is configured to:
when the number of said valid non-reference sectors is at least 2, obtain valid intersections of said reference sector with the valid non-reference sector and a alternate sector in said neighboring base station respectively; and determine the second location information of said mobile station according to location information of the obtained valid intersections.

14. The apparatus as claimed in claim 13, wherein said threshold is determined by following values, comprising: a distance from said mobile station to half of the sector lobe angle of said reference sector; and/or an average distance of distances from said mobile station to all the valid intersections.

15. The apparatus as claimed in claim 12, wherein said second determining unit is configured to:
when the number of said valid non-reference sectors is at least 2, obtain valid intersections of said reference sector with the valid non-reference sector and a alternate sector in said neighboring base station respectively; and determine the second location information of said mobile station according to location information of the obtained valid intersections.

16. The apparatus as claimed in claim 15, wherein said threshold is determined by following values, comprising: a distance front said mobile station to half of the sector lobe angle of said reference sector; and/or an average distance of distances from said mobile station to all the valid intersections.

* * * * *